(12) United States Patent
Bekooij

(10) Patent No.: US 8,065,459 B2
(45) Date of Patent: Nov. 22, 2011

(54) MULTI-PROCESSING SYSTEM AND A METHOD OF EXECUTING A PLURALITY OF DATA PROCESSING TASKS

(75) Inventor: Marco J. G. Bekooij, 'S Hertogenbosch (NL)

(73) Assignee: NXP B.V., Eindhoven (NL)

( * ) Notice: Subject to any disclaimer, the term of this patent is extended or adjusted under 35 U.S.C. 154(b) by 5 days.

(21) Appl. No.: 12/301,148

(22) PCT Filed: May 14, 2007

(86) PCT No.: PCT/IB2007/051824
§ 371 (c)(1),
(2), (4) Date: Dec. 10, 2009

(87) PCT Pub. No.: WO2007/132424
PCT Pub. Date: Nov. 22, 2007

(65) Prior Publication Data
US 2010/0115168 A1 May 6, 2010

(30) Foreign Application Priority Data
May 17, 2006 (EP) .................................... 06114088

(51) Int. Cl.
*G06F 13/36* (2006.01)
(52) U.S. Cl. ......................... 710/244; 710/240; 710/200
(58) Field of Classification Search .......... 710/240–244, 710/200; 370/232; 711/153
See application file for complete search history.

(56) References Cited

U.S. PATENT DOCUMENTS

| 5,881,264 | A | 3/1999 | Kurosawa |
| 6,219,759 | B1 | 4/2001 | Kumakiri |
| 7,474,670 | B2 * | 1/2009 | Nowshadi ..................... 370/462 |
| 7,626,997 | B2 * | 12/2009 | Yoshikawa ..................... 370/447 |
| 2001/0049769 | A1 | 12/2001 | Ono |
| 2006/0064695 | A1 * | 3/2006 | Burns et al. ................... 718/100 |

FOREIGN PATENT DOCUMENTS

WO 99/21089 A 4/1999

OTHER PUBLICATIONS

Douceur, J.R., et al; "Progress-Based Regulation of Low-Importance Processes"; Proceedings of the ACM Symposium on Operating Systems Principles, vol. 33, No. 5; Dec. 12, 1999; pp. 247-260.

* cited by examiner

Primary Examiner — Mark Rinehart
Assistant Examiner — Kim T Huynh

(57) ABSTRACT

A plurality of data processing tasks with processing elements (10) that contend for a resource (18). Execution of each task comprising executing a series of instructions. During execution indications are measured of the speed of progress of executing the instructions for respective ones of the tasks. Requests to access the resource (18) for different ones of the tasks are arbitrated, a priority for judging arbitration being assigned to each task based on the measured indication of the speed of progress of the task. At least over a part of a range of possible speed of progress values increasingly higher priority is assigned in case of increasingly lower indication of the speed of progress.

9 Claims, 2 Drawing Sheets

MULTI-PROCESSING SYSTEM AND A METHOD OF EXECUTING A PLURALITY OF DATA PROCESSING TASKS

The invention relates to a multi-processing system and to a method of executing a plurality of data processing tasks that contend for a resource during execution of the tasks.

A multi-task data processing system executes a plurality of tasks simultaneously on different processors. When these processors share a resource like an access port to main memory, instructions from different tasks can request to access a same resource simultaneously. For example, when different tasks attempt to load or store data in the main memory a load or stores from only one task can be handled at a time. This means that other tasks have to stall until their load or store can be handled. Similar conflicts can arise when a plurality of tasks simultaneously attempt to access the same bus, or a same peripheral device etc.

Such conflicts can make real-time performance of the data processing system unpredictable. When the combination of tasks that are executed simultaneously is not known in advance, it cannot be determined in advance how much the completion of tasks will be delayed due to access conflicts. Thus for example, in an audio/video system this could mean that hick-ups occur in the sound signal or that a video signal freezes.

Conflicts are resolved by an arbitration circuit that determines which request will be handled first when a plurality of conflicting access requests is pending. Many arbitration schemes are known for selecting a task that is awarded access first. Several arbitration schemes are based on an assignment of priorities to the task. In a simple priority based arbitration scheme the requesting task with a highest priority first gets access. In more complicated priority based arbitration schemes requesting tasks with lower priority may also first get access, but at a lower frequency than higher priority tasks. The assignment of priority to tasks is typically static, tasks (e.g. real-time tasks) that need to achieve predetermined time limits being given higher priority than tasks that do not need to meet a time limit.

In the case of contention for main memory access another method to reduce access conflicts is the use of cache memory. By storing copies of information from the main memory in respective cache memories reserved for respective tasks, the number of conflicts can be reduced. However, conflicts cannot be avoided completely, because information has to be loaded from main memory into cache memory if it is not present in the cache memory and/or write data has to be copied to main memory. When data has to be loaded a task has to stall until the data has been read from main memory.

US patent application No 2001/0049769 describes an instruction prefetching scheme for loading instructions into a cache memory in advance of execution by a task. The prefetching scheme uses a "time allowance" to determine priority for arbitration between access requests to the main program memory. The time allowance represents the difference between the expected time at which the prefetched instructions of different tasks are expected to be executed and the actual time. When a prefetch request for an instruction is issued the cache memory includes the expected time in the prefetch request and the arbiter first grants the prefetch request that has least time allowance. Thus the risk that a task will have to stall because of unavailability of instructions in the cache memory is minimized.

However, the scheme proposed by US2001/0049769 only addresses instruction prefetching. The much less predictable conflicts due to data fetching or writing by instructions of the task is not addressed. The scheme requires prediction of the execution time of future instructions, from which the time allowance can be determined. Moreover, US2001/0049769 only seeks to avoid stalls. It does not address multi-tasking nor does it take account of whether the stalls are actually relevant for real time time-limits of different tasks. For example, if the mechanism US2001/0049769 would be used in a multitasking it would attempt to avoid stalls of each task irrespective whether a time limit for the task can be met even after a stall, with the possible effect that there is no guarantee that a stall in one task, wherein the stall does not make it impossible to meet the time-limit, will be avoided at the expense of a stall of another task that does not meet its time-limit as a result.

Among others, it is an object to increase the reliability with which tasks in a multi-processing environment achieve their time-limits.

Among others, it is an object to increase the reliability of real time performance of a multi-processing system during execution of not-predetermined combinations of tasks.

Among others, it is an object to provide for a mechanism of arbitrating between access request to a shared resources by instructions from different tasks that are executed simultaneously in a multi-processing system.

A multi-processor circuit according to claim 1 is provided. Herein conflicts between access requests from processing elements to a shared resource are arbitrated. The shared resource may for example be a shared memory, a communication bus, a peripheral device etc. A priority setting circuit sets the priority for each processing element. Each processing element executes a series of instructions in successive instruction cycles to perform a respective task. The relative priorities of different processing elements are set according to measured indication of a speed of progress of execution of the series of instructions of the tasks executed by the processing elements. With increasingly lower speed of progress increasingly higher priority may be used.

In an embodiment the priority setting circuitry determines the indication of the speed of progress up to an instruction dependent on a count of instruction execution cycles that have occurred before reaching said instruction. These cycles include cycles in which instructions of the task were actually executed and "lost" cycles, wherein the processing element has stalled execution of an instruction of the task for example because it did not soon enough get access to the shared resource. In this way the effect of unusually high losses can be compensated by increasing priority.

In an embodiment the speed of progress is compared with a nominally expected progress and priority of a processing element is set higher dependent on the difference between the speed of progress of its task and the nominally expected speed.

In an embodiment a number of instruction stalls or lost cycles is counted that has occurred between a reference instruction cycle and execution of the particular one of the instructions and the counted number is used to set the priority. Thus no detailed information from execution of the task is needed to gather the required information about the speed of progress.

In an embodiment a count of instruction cycles lost due to loss of arbitration are selectively counted to obtain the indication of the speed of progress. Thus only information about losses due to sources outside a processing element us counted. Causes of stalls inside the same processing elements need not be counted because their effect on the speed is more predictable and can be accounted for by starting a task in time. Moreover in this embodiment it suffices to use information that is available at the arbitration level to set priority according to speed of progress, without requiring detailed information from execution of the task. In different embodiments either the number of losses due to arbitration or the number of cycles due to such losses may be counted.

In an embodiment the priority at an instructions of the task is increased with increasing difference between the counted number of instruction stalls (or lost instruction cycles) and a predetermined fraction of the number of instruction cycles used to reach said instruction. In a further embodiment no information about an intended completion time of the task is used to set priority, but only rate of stalls (or lost cycles) compared to a predetermined rate of stalls (or lost cycles). In this way the starting time of the task is effectively used as an indication of desired completion time. In this way a minimum of interaction with task execution is used to set priority, which simplifies processing. In an alternative embodiment the completion time is used to compute an acceptable rate of loss due to stalls for comparison with the actual rate, to control priority. However, in this case it is necessary to define a measure of time for the processing system, which complicates design.

In an embodiment the tasks are executed according to a token based model, wherein each task is executed repeatedly. Each execution of a task requires a predetermined number of tokens (which may be input data units, such as a predetermined number of audio or video signal samples, or control data) and produces a predetermined number of tokens. FIFO buffers are provided for the tokens. Execution of a task is triggered when the input token (or tokens) for execution of the task is stored in its input buffer and there is space for storing the output token in the output buffer. This form of task execution conventionally allows reliable prediction whether a combination of repeatedly executed tasks will be able to meet real time requirements when there are not unpredictable effects due to resource conflicts.

By combining token based execution with arbitration for shared resources based on relative priorities set dependent on speed of progress measured by cycle counting from the start of execution tasks, reliable prediction can be combined with the unpredictabilities of resource conflicts.

In an embodiment wherein each processing element comprises a cache memory and the shared resource is a main memory from which data is cached in the processing elements, stalls upon cache misses are counted to determine the speed of progress that is used to set priority for arbitration. In this way only the unpredictable part of delay due to resource conflicts is measured to determine speed of progress (unpredictable in the sense that it depends on the combination of tasks in different processing elements, cache misses within a processing element being considered predictable). In this way a minimum of overhead is required for arbitration that compensates for the unpredictable effects of combinations of tasks executed by different processing elements.

These and other objects and advantageous aspects will become apparent from a description of exemplary embodiments, using the following figures.

Figure 1:
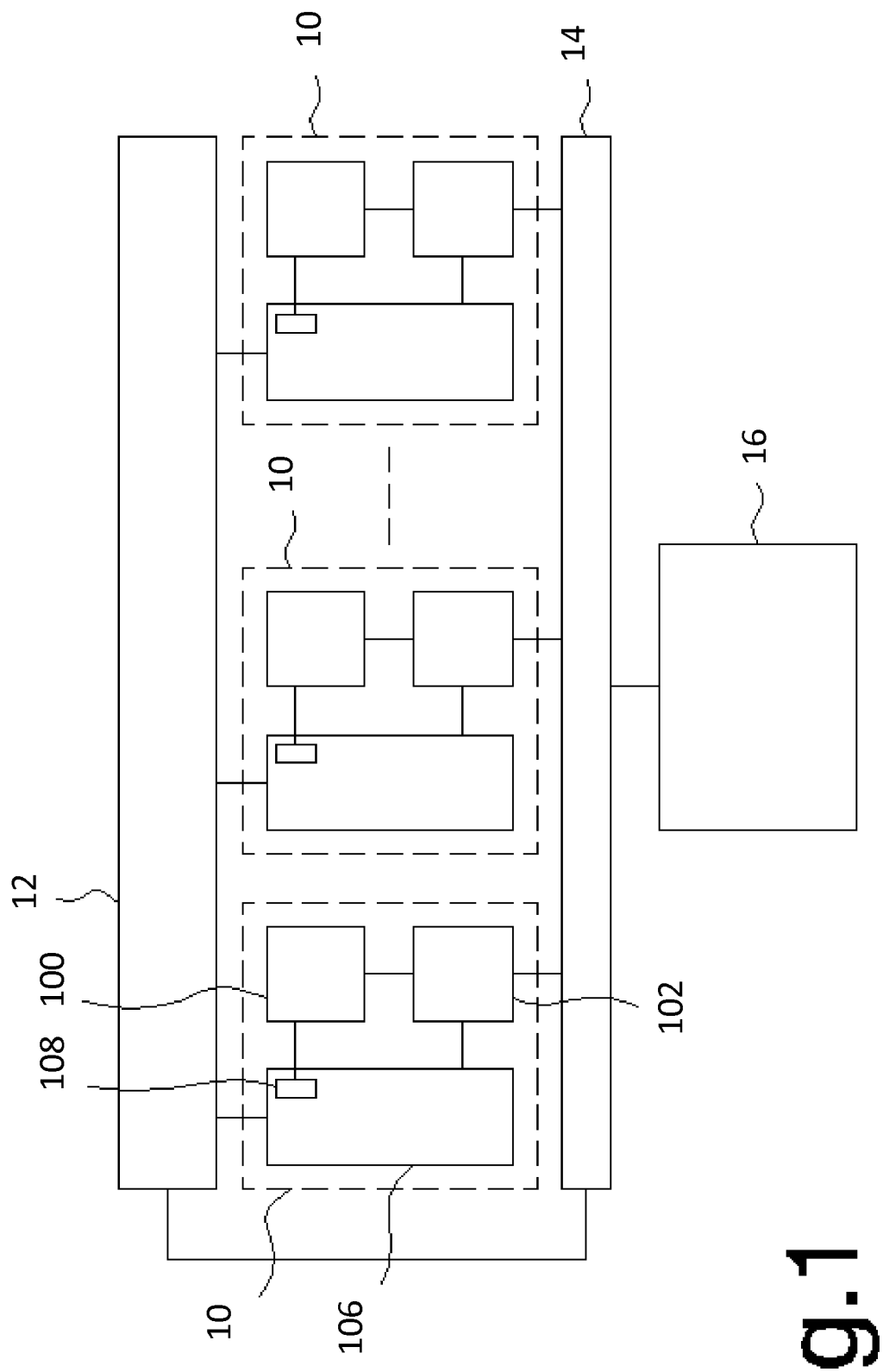
FIG. 1 shows a data processing system

FIG. 1 shows a data processing system, comprising a plurality of processing elements 10, an arbiter circuit 12, a multiplexing circuit 14 and a main memory 16. Each processing element 10 comprises a processor circuit 100, a cache memory unit 102 and an access controller 106 with a progress information register 108. In each processing element 10 processor circuit 100 is coupled to cache memory unit 102 and access controller 106. Access controller 106 is coupled to cache memory unit 102 and to arbiter circuit 12. Cache memory unit 102 is coupled to main memory 16 via multiplexing circuit 14. Arbiter circuit 12 has an output coupled to a control input of multiplexing circuit 14.

In operation processor circuits 100 execute respective programs of instructions, called tasks, in parallel. For the sake of simplicity a description will be given for the case that each processing circuit 100 executes only one task, but it should be appreciated that in practice a processing circuit 100 may execute a plurality of tasks in time-multiplexed fashion. During execution, a processor circuit 100 may execute load and/or store instructions that are part of a task and which will be called access instructions. Such an access instruction causes processor circuit 100 to load data from cache memory unit 102 or to store data in cache memory unit 102.

Under certain conditions an access instruction will cause cache memory unit 102 to access main memory 16 and to stall execution of the task by processing circuit 100 until access to main memory 16 has been completed. This will happen for example if cache memory unit 102 finds that a load instruction addresses a memory location for which no cached data is stored in cache memory unit 102. Cache memory unit indicates a request to access main memory 16 to access controller 106, which forwards the indication to arbiter circuit 12. Arbiter circuit 12 receives such indications from each of the plurality of processing elements 10. When arbiter circuit 12 has only one pending request, it causes multiplexing circuit 14 to couple the cache memory unit 102 of the processing element 10 that made the request to main memory 16 to complete execution of the access instruction.

In the case of simultaneously pending requests from different processing elements 10, arbiter circuit 12 selects one of the processing elements 10 for which there are pending requests and causes multiplexing circuit 14 to couple the cache memory unit 102 of the selected processing element 10 to main memory 16 to complete execution of the access instruction. Typically, this involves passing an address from cache memory unit 102 to main memory 16 and passing data from main memory 16 to cache memory unit 102 and/or passing data from cache memory unit 102 to main memory 16. The other processing elements 10 with pending request stall (cease to execute instructions) and their access requests remain pending. Once the access request from the selected one of the processing elements 10 has been handled the process repeats. Arbiter circuit 12 selects one of the processing elements 10 for which requests remain pending or for which a new request has been made and so on.

It should be appreciated that access to main memory 16 from a cache memory unit is used as an example of the more general problem of possible conflicts in a data processing system. Alternatively, or additionally, there may be conflicts when access to a same bus (not shown, but a bus connected to main memory 16 and/or to peripheral circuits may be involved for example) is requested for a plurality of the processor circuits 100, or when access to a same peripheral circuit (not shown) is requested from such a plurality. In each case an arbitration circuit is needed to select the processing element 10 for which access will be granted first. This applies also to data processing systems that contain no main memory 16 or cache memory units 102. However, as the principles of selection are the same in each case, selection will be illustrated using the example of access to main memory 16 from cache memory units 102.

The selection, by arbiter circuit 12, from the processing elements 10 for which access requests to main memory 16 are pending is called arbitration. Arbitration is based on priorities indicated by access controllers 106. In a simple embodiment, arbiter circuit 12 simply selects the processing element for which the highest priority is indicated, or one from a plurality of processing elements 10 for which the same priority is indicated, which is higher than the priority of any other processing element 10. However, more complicated priority based schemes are known per se and may be used in other embodiments, such as round robin schemes wherein each processing element 10 is first to be selected in turn, more turns being given to processing elements with higher priority. In each priority based embodiment individual priorities are assigned to respective processing elements 10 and processing elements are selected in such a way that processing elements win arbitration relatively more frequently when they have higher priority. Any known prior priority based arbitration scheme may be used.

Access controllers 106 set the priority for their corresponding processing elements 10, based on relative speed of progress of execution of the task, i.e. progress relative to intended speed of progress. The more the relative speed of progress the lower the priority that is set, for at least part of the range of possible relative speed of progress values.

Access controller 106 keeps information about speed of progress and/or relative progress in speed of information register 108. Although a register is shown for this purpose, it should be understood that any storage circuit may be used, for example a location in an addressable memory, a hardware register etc. Progress information is set in progress information register 108 at at least one timepoint linked to execution of a task, for example at the start of execution of the task. In one embodiment processor circuit 100 executes one or more instructions to set the progress information.

Figure 2:
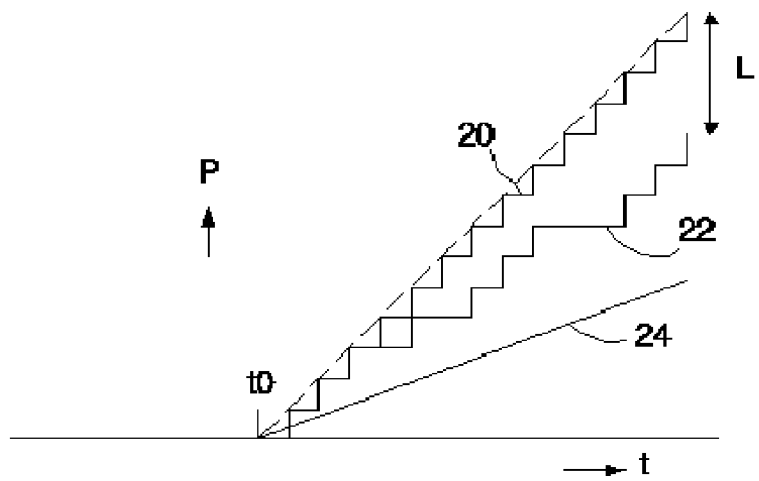
FIG. 2 shows a graph of progress for a task versus time
Figure 2A:
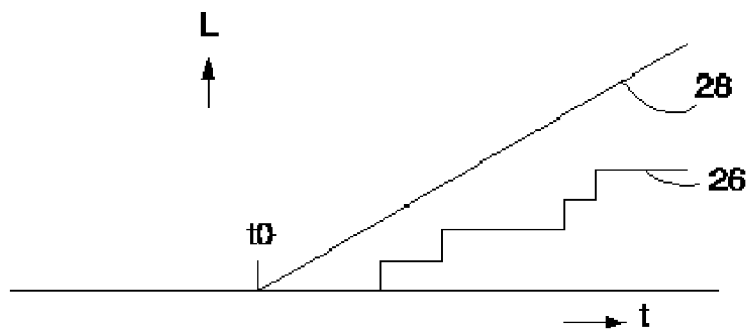
FIG. 2a shows a graph of stall count for a task versus time

FIGS. 2, 2a illustrate the considerations behind this progress value. Time "t" is plotted horizontally and the starting time point of a task t0 is indicated. The number of executed instructions P is plotted vertically. One line 20 indicates maximal speed of progress when the processing element stalls in none of the execution cycles. A second line 22 indicates an example of actual speed of progress, wherein a number of execution cycles is lost due to stalling. After a certain amount of time a loss of L cycles has occurred, which is the difference between the maximal line 20 and the actual line 22.

FIG. 2a illustrate the loss L as a function of time with a loss line 26. It is assumed that loss L of cycles is equal to, or proportional to the number of times that there is a loss. Even if this is not the case the loss L may be the number of lost cycles or the number of times a loss occurs. It should be emphasized that the loss "L" depends on the combination of tasks that is executed by different processing elements 10. If more tasks are executed simultaneously, and/or the executed tasks that are executed cause relatively many cache misses, the loss L will be higher than if fewer tasks are executed simultaneously or the tasks that are executed cause relatively fewer cache misses. The number of combined tasks and their type (which is relevant for cache misses) is not determined beforehand: it may depend on unpredictable events, such as activation of tasks by a user. Hence the loss L is also unpredictable beforehand.

Access controller s106 may be implemented for example as microprocessor circuit programmed to count progress and to compute priority from the count. Alternatively a counter circuit may be used coupled to a priority output optionally via count-priority conversion circuit. Although it is preferred that access controller 106 updates the priority in each instruction cycle, it should be appreciated that priority may be updated less frequently, for example every M instruction cycles (M=2, 3 etc for example). In this case priority computed for one cycle applies to the subsequent cycles of the M cycles as well.

In an embodiment each access controller 106 is designed to adjust priority for its corresponding processing element 10 with the aim to promote that actual progress leads to completion of the task before an intended completion time. A third line 24 defines a nominally desired progress from the start time t0, which would lead to completion before the intended completion time. The third line 24 allows for projected loss of a predetermined fraction of cycles to stalls. In FIG. 2a the projected loss is indicated by a projected loss line 28. In an embodiment access controller 106 uses the time dependent difference between the nominally expected progress (as shown by third line 24) or projected loss and the actual progress (as shown by second line 22) or loss to set priority for its corresponding processing element 10.

In a first embodiment processor circuit 100 sets progress information including a cycle counter and a stall counter to zero at the start of execution of a task. Subsequently access controller 106 increases the cycle counter for each instruction cycle and the stall counter for each instruction cycle wherein processing element 10 is stalled. In this embodiment access controller 106 uses the difference between the stall count and a predetermined fraction of the cycle count to set the priority. The predetermined fraction corresponds to the ratio of the slopes of projected loss 28 and maximal speed of progress 20. The difference reflects a deviation from projected speed of progress and will be higher when there is less progress and lower when there is better progress.

In one further embodiment priority is simply proportional to actual loss minus the projected fraction. In another embodiment this difference is quantized to obtain priority (i.e. a number of ranges of difference values are defined, successive ranges being associated each with a successively higher priority value). In each embodiment the priority may optionally be limited to a maximum if the difference exceeds a first threshold and a minimum if the difference is lower than a second threshold.

It should be appreciated that different embodiments may be used to realize the same effect. For example a single relative progress value may be maintained in progress information register 108, when this register is set to zero at the start of the task and incremented by a first amount for each instruction cycle wherein processing element 10 is stalled and decreased by a second amount for each instruction cycle wherein processing element 10 is not stalled. The ratio between the first amount and the second amount corresponds to the ratio of the slopes of maximal speed of progress and projected loss rate. In any given execution cycle the resulting content in progress information register 108 represents the difference between the maximal progress line and the actual progress line at the time of that execution cycle. The content is then used to determine priority as described in the preceding.

In the illustrated embodiments the relative progress is determined merely using start time information (e.g. in form of initializing the content of progress information register 108 to a standard value) dependent on execution of task. This considerably simplifies determination of priority, since no information about absolute final completion time is needed.

The start of a task may be controlled in a known way by the supply of data needed by the task. For example, a task that processes a signal sample or a block of signal samples can be started repeatedly, each time when such a sample or block of samples is available. Data or a block of data needed to start a task will be called a "token". Tokens also can be control tokens sent to enable a start of a task without supplying data.

In a further embodiment, FIFO queue buffers are provided for communicating tokens between tasks (for example in main memory 16). In this embodiment a task may be started each time when the needed token or tokens for a next execution is or are available in its input buffer or buffers and space for storing an output token or tokens is available in the buffers for communication of tokens to client tasks that consume those tokens from the task.

In such a system the start of tasks is controlled by the supply and consumption of tokens, for example by sampling or output of a signal such as a video signal or an audio signal. In such a system relative priorities defined in terms of start times of tasks can be used to realize real-time performance. This can be advantageously combined with priority setting based on relative progress from the start time, without requiring information about required end time of a task. As may be noted this way of setting priority does not account for variations in the number of instructions needed for a task, for example due to the need to execute different branches of instructions dependent on the values of the data. It is assumed that this variation is sufficiently small to be caught by control based on the tokens. A more detailed control can be obtained by splitting a task in a series of successive smaller tasks, in which case the relative progress information can be reset each time when one of the smaller tasks starts. This provides for more refined control, wherein data dependent variations can remain localized to specific tasks.

In other embodiments access controller 106 may use further information to set priority, such as the intended completion time tf and expected number N of needed not-stalled execution cycles of the task. The difference between the intended completion time tf and the start time t0 defines a budget B of execution cycles. Hence there is a surplus of S=B−N execution cycles. In an embodiment the surplus S is used to control priority, for example by setting the slope of the projected loss to S/(tf−t0) and using one of the earlier described methods of priority setting. Thus, access controller 106 will signal higher priority when more stalls have occurred than allowed on average during execution of the task according to the budget.

In other embodiments access controller 106 may the surplus S is loaded into a storage element when the task starts and decremented each time when a stall occurs during execution of an instruction from the task. In this embodiment the priority is increased when the decremented surplus drops blow a first threshold, further increased when the decremented surplus drops below a second threshold and so on. Eventually, when the surplus is zero or some predetermined value the task is given higher priority than any other task. This serves to ensure that the task will be finished on time. However, this in turn may have the effect that other tasks are blocked. Therefore preferably some average based criterion is used to determine priority and to increase priority to less than absolutely highest priority more in advance.

Instead of the number of stalls other criteria may be used to determine relative progress (or lack thereof), such as for example a program counter value of the task, or execution of instructions by the task to signal progress. From this information instead of the count of stalls the priority can be determined as described in the preceding. However, counting stalls has the advantage that no internal information about the task is necessary.

In another embodiment only stalls due to main memory conflicts during access to handle cache misses are counted (i.e. cache misses per se do not contribute to the count if they are resolved by access to main memory without delay due to lost arbitration). In this way only the part of loss is counted that is due to the combination of tasks on different processing elements. Other types of loss, such as loss due to cache misses per se, can be accounted for and handled in the context of a processing element. By counting only the part that is due to combinations of processing elements the regulation of priority can be specifically directed at compensating for the effects of this interaction between processing elements. Moreover no internal information from a processing element is needed.

As mentioned, processor circuits 100 may also execute a number of tasks in time multiplexed fashion. In an embodiment wherein each task finishes before other tasks can start the above-described technique may be used without alteration. In an embodiment wherein each task is given a predetermined fraction of the execution cycles during time multiplexed execution also the above described technique can be used, this fraction taking the place of the maximal progress for example.

In another embodiment the different tasks are allowed to contend for processing cycles. In this case the priority for arbitrating for contention for the processor circuit may be selected as described for access to main memory. Also, cycles (or blocks of cycles) lost to other tasks may be counted to determine loss of relative progress.

A similar mechanism may be used for arbitrating access to other resources, such as busses, dedicated hardware and peripheral devices. In an embodiment wherein access requests from a task to more than one type of resource is arbitrated, the priorities for access to each resource are preferably determined from one count of relative progress for the task, computed for example from a sum of losses due to lost arbitration to all resources. Thus, a priority setting system with a minimum of overhead can be realized.

It is remarked that the scope of protection of the invention is not restricted to the embodiments described herein. Parts of the system may implemented in hardware, software or a combination thereof. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A multi-processor circuit, comprising
   a plurality of processing elements each configured to execute at least a respective task comprising execution of a series of instructions;
   a shared resource coupled to the plurality of processing elements;
   an arbitration circuit coupled to the processing elements and configured to arbitrate conflicting access requests to the shared resource from the plurality of processing elements dependent on priorities assigned to the processing elements;
   priority setting circuitry configured to measure an indication of a speed of progress of execution of respective ones of the tasks and to set the priority for each processing element that executes a particular one of the tasks dependent on the measured indication of the speed of progress of execution of the series of instructions of the particular one of the tasks,
   wherein the priority setting circuitry is configured to determine the indication of the speed of progress of the particular one of the tasks at a particular one of the instructions in the particular one of the tasks using a count of instruction execution cycles that have occurred before reaching said particular one of the instructions from a reference instruction execution cycle that has a predetermined relation to a start of execution of the particular one of the tasks and a count of stalled instruction execution cycles between the reference instruction cycle and execution of the particular one of the instructions.

2. A multi-processor circuit according to claim 1, wherein the priority setting circuitry is configured to determine the indication of the speed of progress achieved at the particular one of the instructions relative to a nominally expected indication of the speed of progress up to the particular one of the instructions and setting priority of the particular one of the tasks at the particular one of the instructions increasingly higher when said indication of the speed of progress is increasingly lower relative to the nominally expected indication of the speed of progress, at least over a part of a range of possible indication values.

3. A multi-processor circuit according to claim 1, wherein the priority setting circuitry is configured to increase the priority at the particular one of the instructions of the task with increasing difference between the count of stalled instruction execution cycles and a predetermined fraction of the count of instruction execution cycles.

4. A multi-processor circuit according to claim 1, wherein the processing elements are configured to maintain a first in first out input buffer for input tokens and a first in first out output buffer for output tokens, the processing elements being configured to execute the particular one of the tasks repeatedly, each execution consuming a successive input token from the input buffer and producing a successive output token in the output buffer, the processing elements being configured to trigger the start of execution of the particular one of the tasks when the input token for the particular one of the tasks is stored in its input buffer and there is space for storing the output token in the output buffer.

5. A multi-processor circuit according to claim 1, comprising a shared main memory, the shared resource comprising the shared main memory, each processing element comprising a respective cache memory coupled to the shared main memory for caching data from the shared main memory, priority setting circuitry being configured to compute the indication of the speed of progress by counting stalls due to access conflicts arising upon cache misses.

6. A method of executing a plurality of data processing tasks with processing elements that contend for a resource, execution of each task comprising executing a series of instructions, the method comprising:

measuring indications of the speed of progress of executing the instructions for respective ones of the tasks, including determining an indication of the speed of progress of the particular one of the tasks at a particular one of the instructions in the particular one of the tasks using a count of instruction execution cycles that have occurred before reaching said particular one of the instructions from a reference instruction execution cycle that has a predetermined relation to a start of execution of the particular one of the tasks and a count of stalled instruction execution cycles between the reference instruction cycle and execution of the particular one of the instructions; and arbitrating requests to access the resource for different ones of the tasks, a priority for judging arbitration being assigned to each task based on the measured indication of the speed of progress of the task, increasingly higher priority being assigned in case of increasingly lower indication of the speed of progress, at least over a part of a range of possible speed of progress values.

7. A method according to claim 6, the method comprising determining the indication of the progress achieved at the particular one of the instructions relative to a nominally speed of expected indication of the speed of progress up to the particular one of the instructions and setting the priority of the task at the particular one of the instructions of the task higher when said indication of the speed of progress is lower relative to the nominally expected indication of the speed of progress.

8. A method according to claim 6, the method comprising increasing the priority of the task at the particular one of the instructions based on increasing difference between the count of stalled instruction execution cycles and a predetermined fraction of the count of instruction execution cycles.

9. A method according to claim 6, comprising
maintaining a first in first out input buffer for input tokens and a first in first out output buffer for output tokens for each of the tasks, the output buffers for at least a first part of the tasks being input buffers for at least a second part of the tasks;
executing the particular one of the tasks repeatedly, each execution consuming a successive input token from the input buffer and producing a successive output token in the output buffer;
triggering the start of execution of the particular one of the tasks when the input token for the particular one of the tasks is stored in its input buffer and there is space for storing the output token in the output buffer.

\* \* \* \* \*